US012315059B2

United States Patent
Ding et al.

(10) Patent No.: US 12,315,059 B2
(45) Date of Patent: May 27, 2025

(54) METHOD FOR GENERATING A TALKING HEAD VIDEO WITH MOUTH MOVEMENT SEQUENCE, DEVICE AND COMPUTER-READABLE STORAGE MEDIUM

(71) Applicant: UBTECH ROBOTICS CORP LTD, Shenzhen (CN)

(72) Inventors: Wan Ding, Shenzhen (CN); Dongyan Huang, Shenzhen (CN); Linhuang Yan, Shenzhen (CN); Zhiyong Yang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 173 days.

(21) Appl. No.: 18/202,291

(22) Filed: May 26, 2023

(65) Prior Publication Data
US 2023/0386116 A1 Nov. 30, 2023

(30) Foreign Application Priority Data
May 31, 2022 (CN) .......................... 202210612090.4

(51) Int. Cl.
*G06T 13/20* (2011.01)
*G06T 13/40* (2011.01)
*G06V 40/20* (2022.01)
*G10L 13/02* (2013.01)
(Continued)

(52) U.S. Cl.
CPC ............ *G06T 13/40* (2013.01); *G06T 13/205* (2013.01); *G06V 40/20* (2022.01); *G10L 13/02* (2013.01); *G10L 13/08* (2013.01); *G10L 2021/105* (2013.01)

(58) Field of Classification Search
None
See application file for complete search history.

(56) References Cited

U.S. PATENT DOCUMENTS

2002/0135618 A1*  9/2002  Maes ................. G10L 15/24
                                                            715/767
2010/0082345 A1*  4/2010  Wang ................. G10L 13/00
                                                            704/E21.02
(Continued)

FOREIGN PATENT DOCUMENTS

CN           113223555 A      8/2021

*Primary Examiner* — Joni Hsu

(57) ABSTRACT

A method for generating a talking head video includes: obtaining a text and an image containing a face of a user; determining a phoneme sequence that corresponds to the text and includes one or more phonemes; determining acoustic features corresponding to the text according to the phoneme sequence, and obtaining synthesized speech corresponding to the text according to the acoustic features; determining a first mouth movement sequence corresponding to the text according to the phoneme sequence, and determining a second mouth movement sequence corresponding to the text according to the acoustic features; creating a facial action video corresponding to the user according to the first mouth movement sequence, the second mouth movement sequence and the image; and processing the synthesized speech and the facial action video synchronously to obtain a talking head video corresponding to the user.

20 Claims, 6 Drawing Sheets

(51) Int. Cl.
  *G10L 13/08* (2013.01)
  *G10L 21/10* (2013.01)

(56) References Cited

U.S. PATENT DOCUMENTS

| | | | | |
|---|---|---|---|---|
| 2014/0210830 | A1* | 7/2014 | Latorre-Martinez | ........................ G06T 13/205 345/473 |
| 2019/0392625 | A1* | 12/2019 | Wang | ........................ G06N 3/08 |
| 2021/0390945 | A1* | 12/2021 | Zhang | ..................... G10L 13/08 |
| 2023/0122824 | A1* | 4/2023 | Narayanan | .............. G10L 13/08 704/200 |

* cited by examiner

METHOD FOR GENERATING A TALKING HEAD VIDEO WITH MOUTH MOVEMENT SEQUENCE, DEVICE AND COMPUTER-READABLE STORAGE MEDIUM

CROSS REFERENCE TO RELATED APPLICATIONS

This application claims priority to Chinese Patent Application No. CN 202210612090.4, filed May 31, 2022, which is hereby incorporated by reference herein as if set forth in its entirety.

TECHNICAL FIELD

The present disclosure generally relates to image processing, and particularly to a method and device for generating a talking head video with mouth movement sequence, and computer-readable storage medium.

BACKGROUND

Talking head video synthesis refers to outputting a multimodal video of a talking head corresponding to an input text and a facial image according to the text and the facial image. The multimodal video includes synthesized speech and facial actions. Some conventional method of synthesizing talking head video generally first synthesizes speech based on text, and maps the synthesized speech to the mouth movement sequence of the face through a complex network model, resulting in high complexity of talking head video synthesis.

Therefore, there is a need to provide a method for generating a talking head video to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
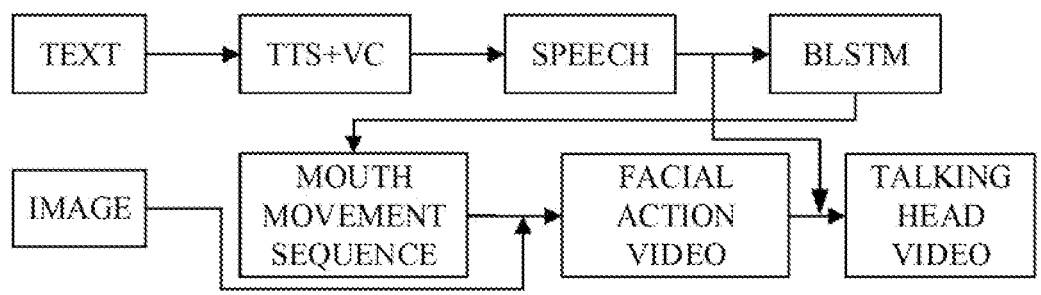
FIG. 1 is a flowchart of a conventional method for creating a talking head video.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 shows a schematic block diagram of the device 110 for creating a talking head video according to one embodiment. The device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for creating a talking head video, such as steps S201 to S206 in FIG. 3, steps S301 to S306 in FIG. 4, and steps S401 to S406 in FIG. 5 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the device 110, such as a hard disk or a memory. The storage 102 may also be an external storage device of the device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the device 100. The storage 102 can also be used to temporarily store data that have been output or is about to be output.

Figure 6:
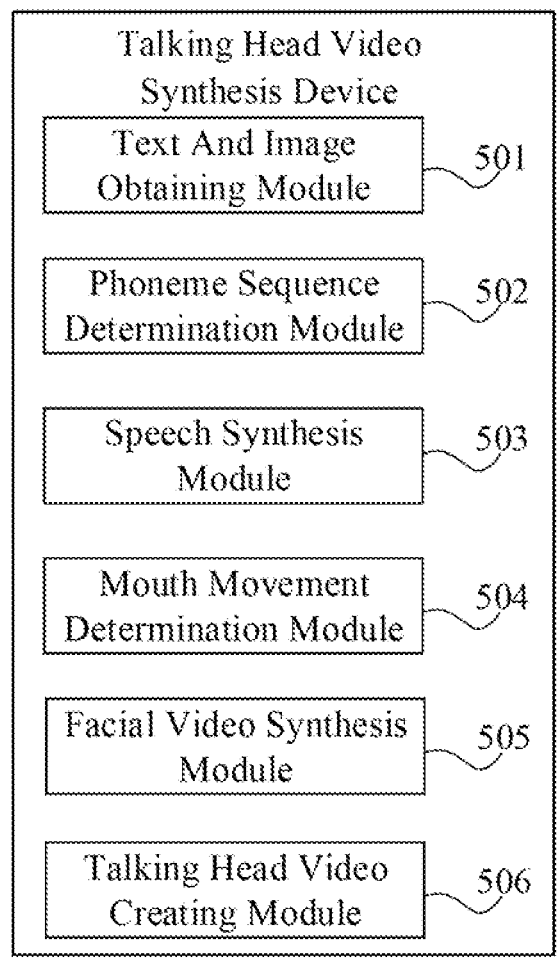
FIG. 6 is schematic block diagram of a talking head video synthesis device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 110. For example, the one or more computer programs 103 may be divided into a text and image obtaining module 501, a phoneme sequence determination module 502, a speech synthesis module 503, a mouth movement determination module 504, a facial video synthesis module 505, and a talking head video creating module 506 as shown in FIG. 6.

It should be noted that the block diagram shown in FIG. 1 is only an example of the device 100. The device 100 may include more or fewer components than what is shown in FIG. 1, or have a different configuration than what is shown in FIG. 1. Each component shown in FIG. 1 may be implemented in hardware, software, or a combination thereof.

Figure 2:
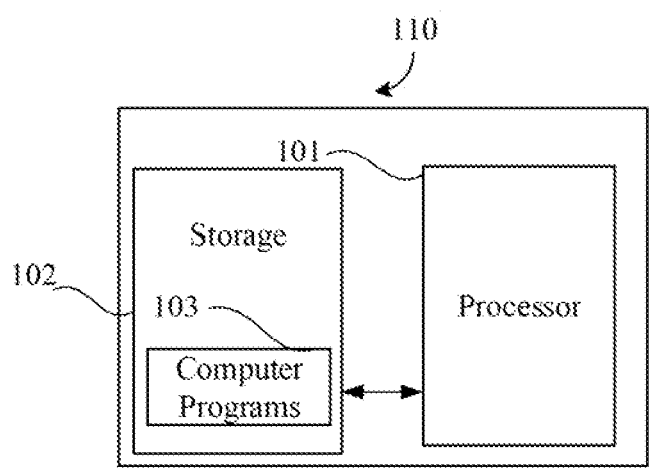
FIG. 2 is a schematic block diagram of a device for creating a talking head video according to one embodiment.

FIG. 2 shows a schematic flowchart of a conventional method for synthesizing a talking head video. This method can be implemented by an electronic device. As shown in FIG. 2, when it needs to synthesize the talking head video, the device may receive a text and a facial image to be synthesized, and convert the text into speech through text to speech (TTS) and voice conversion (VC) technologies. The device can then extract the speech features corresponding to the speech, for example, by using a bidirectional long short-term memory network (BLSTM), and map the speech features to mouth movements of an uttering mouth to obtain the mouth movement sequence corresponding to the text. Then, the device can create a facial action video according to the mouth movement sequence and the facial image, for example, by using a vid2vid algorithm. Finally, the device can align the speech with the facial action video in the time dimension to obtain a multi-modal talking head video. That is, the conventional talking head video synthesis method generally converts text into speech first, and maps the synthesized speech to the mouth movement sequence of the face through a complex network model, resulting in high complexity of talking head video synthesis, reduction in efficiency of the talking head video synthesis, and poor user experience.

In order to solve the problems above, embodiments of the present disclosure provide a talking head video synthesis method, device, and computer-readable storage medium. The method may include: obtaining a text and an image containing a face of a user; determining a phoneme sequence that corresponds to the text and comprises one or more phonemes; determining acoustic features corresponding to the text according to the phoneme sequence, and obtaining synthesized speech corresponding to the text according to the acoustic features; determining a first mouth movement sequence corresponding to the text according to the phoneme sequence, and determining a second mouth movement sequence corresponding to the text according to the acoustic features; creating a facial action video corresponding to the user according to the first mouth movement sequence, the second mouth movement sequence and the image; and processing the synthesized speech and the facial action video synchronously to obtain a talking head video corresponding to the user. According the method, lightweight and accurate mapping of text to phonemes and mapping of phonemes to visemes (that is, mouth movements) can be established based on linguistic knowledge, so that the text and the acoustic features corresponding to the text can be used to predict mouth movements, thereby reducing the complexity of mouth movement prediction, improving the efficiency of talking head video synthesis, improving user experience, and having strong ease of use and practicability.

In one embodiment, the method can be implemented by the device 110. The device 100 can be a mobile phone, a tablet computer, a wearable device, a vehicle-mounted device, an augmented reality (AR)/virtual reality (VR) device, a notebook computer, an ultra-mobile personal computer (UMPC), netbook, personal digital assistant (PDA), desktop computer, cloud server, etc. The present disclosure does not impose any limitation on the specific type of the device 110.

Figure 3:
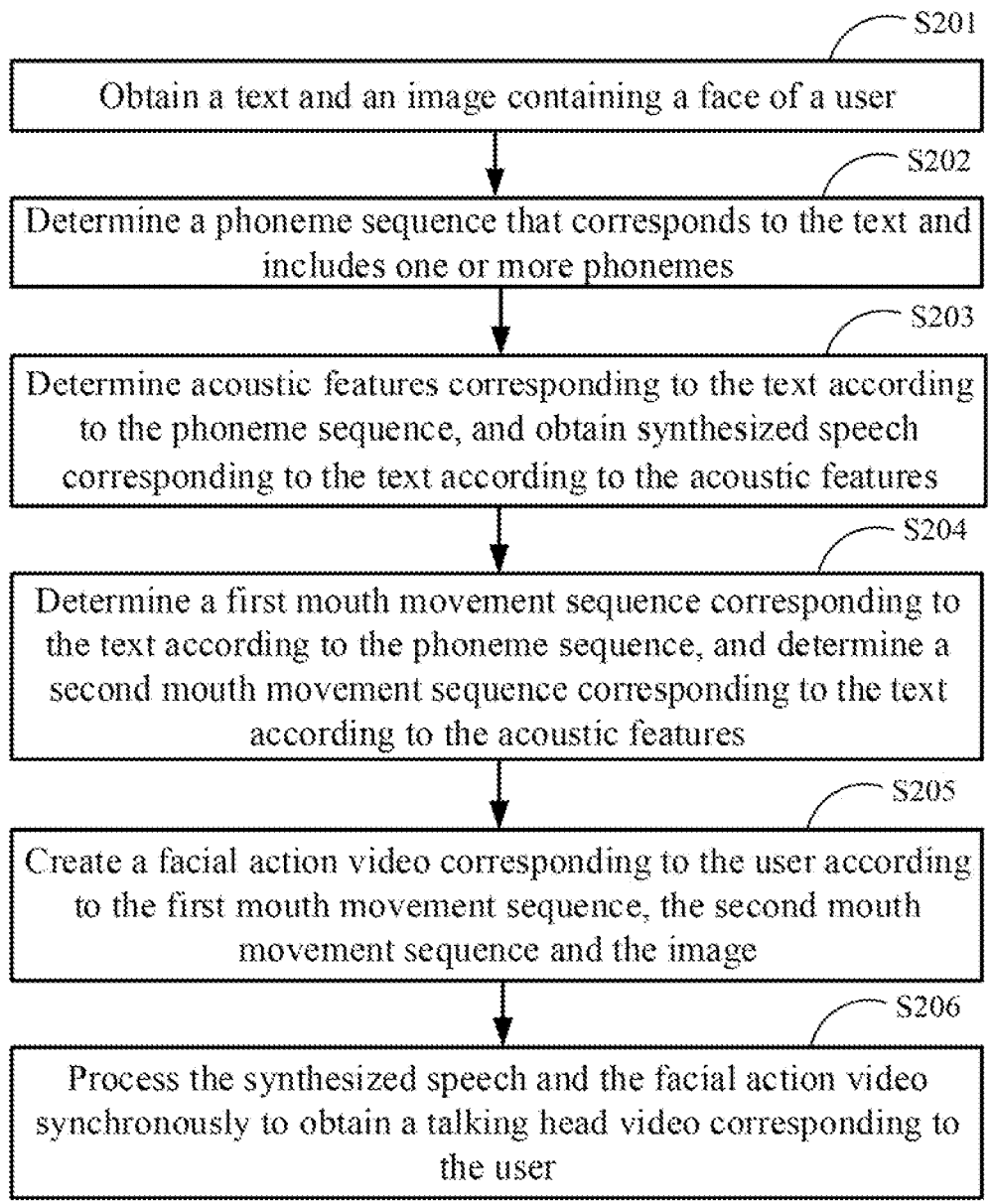
FIG. 3 is an exemplary flowchart of a method for creating a talking head video according to one embodiment.

FIG. 3 is a schematic flowchart of a method for creating a talking head video according to one embodiment. As an example, but not a limitation, the method can be implemented by the device 110. The method may include the following steps.

Step S201: Obtain a text and an image containing a face of a user.

In one embodiment, when creating a talking head video, the device 110 can receive a text and an image to be synthesized from a user. The text can be any text, and the user can be any user. For example, the text can be "tomorrow will be a beautiful day" inputted by a user. The user may be user A, the image can be a facial image of user A, and the talking head video is a video showing the portrait close up of user A saying "tomorrow will be a beautiful day". In one embodiment, the device 110 may include a user input module that can take a variety of forms, such as buttons, keypads, touch screens, cameras, and audio input interfaces that allow user A to input the text and the image to the device 110.

Step S202: Determine a phoneme sequence that corresponds to the text and includes one or more phonemes.

Step S203: Determine acoustic features corresponding to the text according to the phoneme sequence, and obtain synthesized speech corresponding to the text according to the acoustic features.

Exemplarily, after obtaining the text, the device 110 may perform front-end analysis on the text to determine the phoneme sequence corresponding to the text. It should be understood that there may be one or more phonemes included in the phoneme sequence, which may be specifically determined according to the text. Subsequently, the device 110 can obtain the acoustic features corresponding to the text according to the phoneme sequence, and can obtain the speech (hereinafter referred to as synthesized speech) corresponding to the text through a vocoder according to the acoustic features.

It should be noted that the present disclosure does not impose any limitation on the approach that is used by the device 110 to determine the phoneme sequence corresponding to the text and determine the acoustic features corresponding to the text according to the phoneme sequence, which can be determined according to actual scenarios. That is to say, the device 110 can determine the synthesized speech corresponding to the text through any conventional synthesis method.

Step S204: Determine a first mouth movement sequence corresponding to the text according to the phoneme sequence, and determine a second mouth movement sequence corresponding to the text according to the acoustic features.

In one embodiment, after the device 100 obtains the phoneme sequence corresponding to the text, it can map each phoneme in the phoneme sequence to the corresponding viseme according to linguistic knowledge. A viseme is the visual description of a phoneme in spoken language. It defines the position of the face and mouth while a person is speaking. That is, the mouth movement corresponding to each phoneme is roughly determined, and the first mouth movement sequence corresponding to the text is obtained. The first mouth movement sequence may be a rough prediction of the mouth movements.

Exemplarily, the mouth movements can be quantitatively represented by the key points of the mouth. The following will take the key points of the mouth to represent mouth movements as an example for description.

After the device 110 obtains the acoustic features corresponding to the text, it can determine the second mouth movement sequence corresponding to the text according to the acoustic features. The second mouth movement sequence includes details of the mouth movements not included in the first mouth movement sequence.

Exemplarily, the device 110 may input the phoneme sequence corresponding to the text into a first prediction model for prediction processing, and obtain the first mouth movement sequence corresponding to the phoneme sequence output by the first prediction model. Exemplarily, the device 110 may input the acoustic features corresponding to the text into a second prediction model for prediction processing, and obtain the second mouth movement sequence corresponding to the acoustic features output by the second prediction model.

Figure 4:
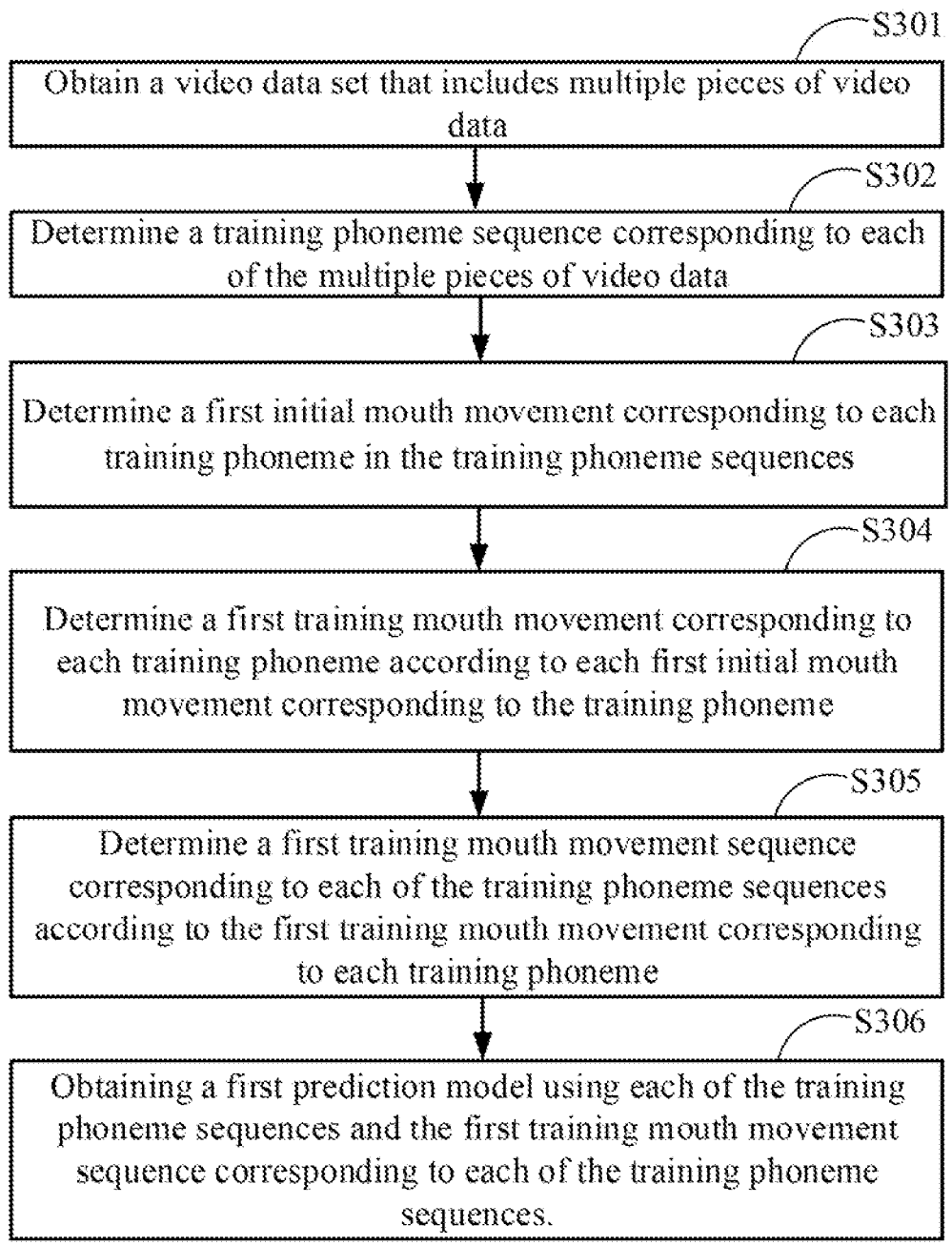
FIG. 4 is an exemplary flowchart for obtaining a first prediction model according to one embodiment.
Figure 5:
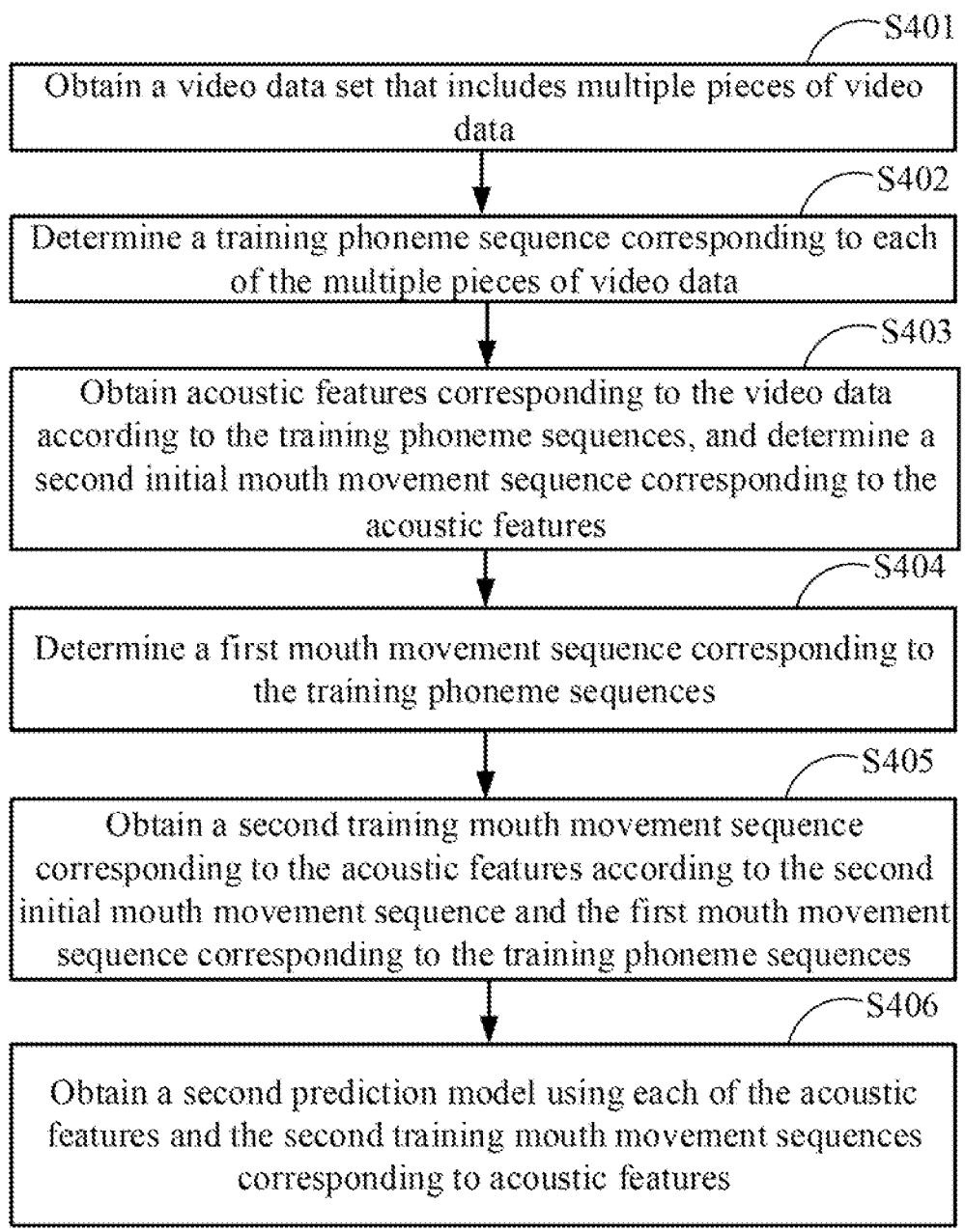
FIG. 5 is an exemplary flowchart for obtaining a second prediction model according to one embodiment.

FIG. 4 shows a schematic flowchart of training a first prediction model according to one embodiment. It should be understood that the device for training the first prediction model may be the device 110, or other devices. Here, an exemplary description will be given by taking the device 100 as an example for performing the training of the first prediction model. As shown in FIG. 4, before the first mouth movement sequence corresponding to the text is determined according to the phoneme sequence, the method may further include the following steps.

Step S301: Obtain a video data set that includes multiple pieces of video data.

The video data set may include video data of different users speaking different contents corresponding to different text, and each piece of video data may include facial images of the user speaking an utterance. It should be understood that the duration of each piece of video data in the video data set may be any value.

Step S302: Determine a training phoneme sequence corresponding to each of the multiple pieces of video data.

After the device 110 obtains the video data set, it can determine the phoneme sequence (hereinafter referred to as the training phoneme sequence) corresponding to each piece of video data. The present disclosure does not impose any limitation on the manner in which the device 110 determines the training phoneme sequence corresponding to each piece of video data, which may be specifically set by technicians according to actual scenarios.

Step S303: Determine a first initial mouth movement corresponding to each training phoneme in the training phoneme sequences.

In one embodiment, after determining the training phoneme sequence corresponding to each piece of video data, for each training phoneme sequence, the device 110 can determine the mouth movement (hereinafter referred to as the first initial mouth movement) corresponding to each training phoneme in the training phoneme sequence. For example, the first initial mouth movement corresponding to each training phoneme may be determined by manual labeling, that is, the key points of the mouth corresponding to each training phoneme may be manually annotated.

Step S304: Determine a first training mouth movement corresponding to each training phoneme according to each first initial mouth movement corresponding to the training phoneme.

Exemplarily, for each training phoneme, after the device 110 obtains the first initial mouth movement corresponding to the training phoneme, for example, after obtaining mouth key points (e.g., the coordinates of each key point of the mouth) corresponding to the training phoneme, the device 110 may determine an average value corresponding to each key point of the mouth, and may determine the average value as a quantized value of the first training mouth movement corresponding to the training phoneme.

For example, for training phoneme A, when training data A, training data B, training data C and training data D all include training phoneme A, after the device 110 obtains the first initial mouth movement A corresponding to the training phoneme A in the training data A, the first initial mouth movement B corresponding to the training phoneme A in the training data B, the first initial mouth movement C corresponding to the training phoneme A in the training data C, and the first initial mouth movement D corresponding to the training phoneme A in the training data D, the device 110 may determine an average value of the first initial mouth movement A, the first initial mouth movement B, the first initial mouth movement C, and the first initial mouth movement D, and determine the average value as the first training mouth movement corresponding to the training phoneme A.

Step S305: Determine a first training mouth movement sequence corresponding to each of the training phoneme sequences according to the first training mouth movement corresponding to each training phoneme.

Step S306: Obtaining a first prediction model using each of the training phoneme sequences and the first training mouth movement sequence corresponding to each of the training phoneme sequences. The first prediction model is to predict the first mouth movement sequence according to the phoneme sequence.

It should be understood that after determining the first training mouth movement corresponding to each training phoneme, the device 110 may combine the first training mouth movement of each training phoneme in each training phoneme sequence to obtain the first training mouth movement sequence corresponding to each training phoneme sequence, and can use each training phoneme sequence and the first training mouth movement sequence corresponding to each training phoneme sequence to train the initial first prediction model to obtain the trained first prediction model.

FIG. 5 shows a schematic flowchart of training a second prediction model according to one embodiment. It should be understood that the device for training the second prediction model may be the device 110, or other devices. Here, an exemplary description will be given by taking the device 110 as an example for performing the training of the second prediction model. As shown in FIG. 5, before the second mouth movement sequence corresponding to the text is determined according to the acoustic features, the method may further include the follow steps.

Step S401: Obtain a video data set that includes multiple pieces of video data.

Step S402: Determine a training phoneme sequence corresponding to each of the multiple pieces of video data.

Step S401 is similar to the aforementioned step S301, and its specific implementation manner may refer to the descriptions related to step S301. Step S402 is similar to the aforementioned step S302, and its specific implementation manner may refer to the descriptions related to step S302. For the sake of brevity, no more details are repeated here.

Step S403: Obtain acoustic features corresponding to the video data according to the training phoneme sequences, and determine a second initial mouth movement sequence corresponding to the acoustic features.

In one embodiment, after determining the training phoneme sequence corresponding to each video data, for each training phoneme sequence, the device 110 can obtain the corresponding acoustic features according to the training phoneme sequence, and determine the mouth movement (hereinafter referred to as the second initial mouth movement) corresponding to each training phoneme in the training phoneme sequence, for example, by manual labeling. That is, the key points of the mouth corresponding to each training phoneme can be manually annotated to obtain the second initial mouth movement sequence corresponding to the acoustic features.

Step S404: Determine a first mouth movement sequence corresponding to the training phoneme sequences.

Step S405: Obtain a second training mouth movement sequence corresponding to the acoustic features according to the second initial mouth movement sequence and the first mouth movement sequence corresponding to the training phoneme sequences.

Exemplarily, for each training phoneme sequence, the device 110 may use the first prediction model to predict the first mouth movement sequence corresponding to the training phoneme sequences. Subsequently, the device 110 may determine the second training mouth movement sequence corresponding to the acoustic features corresponding to the training phoneme sequences according to the second initial mouth movement sequence and the first mouth movement sequence. For example, the device 110 may subtract the corresponding first mouth movement in the first mouth movement sequence from each second initial mouth movement in the second initial mouth movement sequence to obtain the second training mouth movement sequence corresponding to the acoustic feature corresponding to the training phoneme sequences.

For example, for an acoustic feature A, when the second initial mouth movement sequence includes a second initial mouth movement A1, a second initial mouth movement B1, a second initial mouth movement C1, a second initial mouth movement D1 and a second initial mouth movement E1, the first mouth movement sequence may include a first mouth movement A2, a first mouth movement B2, a first mouth movement C2, a first mouth movement D2 and a first mouth movement E2. In this case, the device 110 may subtract the first mouth movement A2 from the second initial mouth movement A1 to obtain a second training mouth movement A3, subtract the first mouth movement B2 from the second initial mouth movement B1 to obtain a second training mouth movement B3, subtract the first mouth movement C2 from the second initial mouth movement C1 to obtain a second training mouth movement C3, subtract the first mouth movement D2 from the second initial mouth movement D1 to obtain a second training mouth movement D3, and subtract the first mouth movement E2 from the second initial mouth movement E1 to obtain a second training mouth movement E3. Then, the device 110 can combine the second training mouth movement A3, the second training mouth movement B3, the second training mouth movement C3, the second training mouth movement D3, and the second training mouth movement E3 to obtain the second training mouth movement sequence corresponding to the acoustic feature A.

Step S406: Obtain a second prediction model using each of the acoustic features and the second training mouth movement sequences corresponding to acoustic features. The second prediction model is to predict the second mouth movement sequence according to the acoustic features.

It should be understood that after determining the second training mouth movement sequence corresponding to each acoustic feature, the device 110 may use each acoustic feature and the second training mouth movement sequence corresponding to each acoustic feature to train the initial second prediction model to obtain the trained second prediction model. The present disclosure does not impose any limitation on the specific structure of the second prediction model, which can be specifically determined by technicians according to actual scenarios.

Step S205: Create a facial action video corresponding to the user according to the first mouth movement sequence, the second mouth movement sequence and the image.

In one embodiment, after the device 110 obtains the first mouth movement sequence (i.e., the rough information of the mouth movement) and the second mouth movement sequence (i.e., the detailed information of the mouth movements) corresponding to the text, it can fuse the first mouth movement sequence and the second mouth movement sequence to obtain the combined mouth movement sequence. Then, the device 110 can obtain the facial action video corresponding to the user according to the fused mouth movement sequence and the image.

It should be noted that the present disclosure does not impose any limitation on the specific implementation manner in which the device 110 obtains the facial action video according to the mouth movement sequence and the image, which can be specifically determined by technicians according to actual scenarios. For example, facial motion videos can be determined by a vid2vid algorithm.

It should be understood that when a person speaks, mouth movements are accompanied by head and eye movements (e.g., blinking). In order to achieve a more natural synthesis of talking head videos, the head and eye movements when speaking should also be predicted. Therefore, in one embodiment, real human video data sets of one or more users (which may or may not include the above-mentioned user A) can be captured based on the assumption that the head and eye movements are independent from the speech and mouth movements. When synthesizing facial action videos, the device 110 can randomly sample the video data sets to obtain a natural head and eye movement sequence, and then combine the head and eye movement sequence and the mouth movement sequence to obtain a combined movement sequence, so as to synthesize the facial action video corresponding to the text according to the combined movement sequence.

Specifically, after determining the phoneme sequence corresponding to the text, the device 110 may determine a first duration corresponding to each phoneme in the phoneme sequence, determine a second duration corresponding to the synthesized speech according to the first duration, and obtain a head and eye movement sequence corresponding to the text according to the second duration. That is, the device 110 can obtain the head and eye movements within the second duration from the preset video data set, and can combine the head and eye movements into a head and eye movement sequence corresponding to the text. Then, the device 110 can obtain the facial action video corresponding to the user according to the first mouth movement sequence, the second mouth movement sequence, the head and eye movement sequence, and the image. That is, the first mouth movement sequence, the second mouth movement sequence, and the head and eye movement sequence can be combined to obtain a combined movement sequence. In this way, the facial action video corresponding to the text can be determined according to the combined movement sequence and the image.

Step S206: Process the synthesized speech and the facial action video synchronously to obtain a talking head video corresponding to the user.

In one embodiment, after obtaining the synthesized speech and facial action video corresponding to the text, the device 110 can synchronize (i.e., align) the synthesized speech and the facial action video in the time dimension, so as to obtain the talking head video corresponding to the user.

According to the embodiments above, the device 110 may perform the following actions: obtaining a text and an image containing a face of a user; determining a phoneme sequence that corresponds to the text and comprises one or more phonemes; determining acoustic features corresponding to the text according to the phoneme sequence, and obtaining synthesized speech corresponding to the text according to the acoustic features; determining a first mouth movement sequence corresponding to the text according to the phoneme sequence, and determining a second mouth movement sequence corresponding to the text according to the acoustic features; creating a facial action video corresponding to the user according to the first mouth movement sequence, the second mouth movement sequence and the image; and processing the synthesized speech and the facial action video synchronously to obtain a talking head video corresponding to the user. By implementing the method, lightweight and accurate text-to-phoneme mapping and phoneme-to-viseme mapping can be established based on linguistic knowledge, so that mouth movements can be predicted through the text and the acoustic features corresponding to the text, thereby reducing the complexity of mouth movement prediction, improving the efficiency of talking head video synthesis, improving user experience, and having strong ease of use and practicability.

It should be noted that, sequence numbers of the foregoing procedures do not indicate an execution sequence. The execution sequence of the procedures should be determined according to functions and internal logic thereof, and should not constitute any limitation to the implementation procedure of the embodiments of the present disclosure.

Corresponding to the talking head video synthesis method described in the embodiments above, the present disclosure further provides a talking head video synthesis device. FIG. 5 shows a structural block diagram of a talking head video synthesis device according to one embodiment. For ease of description, only the modules related to the embodiment are shown.

The talking head video synthesis device may include: a text and image obtaining module 501, a phoneme sequence determination module 502, a speech synthesis module 503, a mouth movement determination module 504, a facial video synthesis module 505, and a talking head video creating module 506. The text and image obtaining module 501 is to obtain a text and an image containing a face of a user. The phoneme sequence determination module 502 is to determine a phoneme sequence that corresponds to the text and includes one or more phonemes. The speech synthesis module 503 is to determine a first initial mouth movement corresponding to each training phoneme in the training phoneme sequences. The mouth movement determination module 504 is to determine a first mouth movement sequence corresponding to the text according to the phoneme sequence, and determine a second mouth movement sequence corresponding to the text according to the acoustic features. The facial video synthesis module 505 is to create a facial action video corresponding to the user according to the first mouth movement sequence, the second mouth movement sequence and the image. The talking head video creating module 506 is to process the synthesized speech and the facial action video synchronously to obtain a talking head video corresponding to the user.

In one embodiment, the talking head video synthesis device may further include a duration determining module and a head movement sequence acquisition module. The duration determining module is to determine a first duration corresponding to each phoneme in the phoneme sequence, and determine a second duration corresponding to the synthesized speech according to the first duration. The head movement sequence acquisition module is to obtain a head and eye movement sequence corresponding to the text according to the second duration.

In one embodiment, the facial video synthesis module 505 is further to create the facial action video corresponding to the user according to the first mouth movement sequence, the second mouth movement sequence, the head and eye movement sequence, and the image.

In one embodiment, the talking head video synthesis device may further include a first data set obtaining module, a first training phoneme sequence determination module, an initial mouth movement determination module, a training mouth movement determination module, a first training mouth movement sequence determination module, and a first prediction model training module. The first data set obtaining module is to obtain a video data set that includes multiple pieces of video data. The first training phoneme sequence determination module is to determine a training phoneme sequence corresponding to each of the multiple pieces of video data. The initial mouth movement determination module is to determine a first initial mouth movement corresponding to each training phoneme in the training phoneme sequences. The training mouth movement determination module is to determine a first training mouth movement corresponding to each training phoneme according to each first initial mouth movement corresponding to the training phoneme. The first training mouth movement sequence determination module is to determine a first training mouth movement sequence corresponding to each of the training phoneme sequences according to the first training mouth movement corresponding to each training phoneme. The first prediction model training module is to obtain a first prediction model using each of the training phoneme sequences and the first training mouth movement sequence corresponding to each of the training phoneme sequences. The first prediction model is to predict the first mouth movement sequence according to the phoneme sequence.

In one embodiment, the talking head video synthesis device may further include a second data set obtaining module, a second training phoneme sequence determination module, an acoustic feature acquisition module, a mouth movement sequence determination module, a second training mouth movement sequence determination module, and a second prediction model training module. The second data set obtaining module is to obtain a video data set that includes multiple pieces of video data. The second training phoneme sequence determination module is to determine a training phoneme sequence corresponding to each of the multiple pieces of video data. The acoustic feature acquisition module is to obtain acoustic features corresponding to the video data according to the training phoneme sequences, and determine a second initial mouth movement sequence corresponding to the acoustic features. The mouth movement sequence determination module is to determine a first mouth movement sequence corresponding to the training phoneme sequences. The second training mouth movement sequence determination module is to obtain a second training mouth movement sequence corresponding to the acoustic features according to the second initial mouth movement sequence and the first mouth movement sequence corresponding to the training phoneme sequences. The second prediction model training module is to obtain a second prediction model using each of the acoustic features and the second training mouth movement sequences corresponding to acoustic features. The second prediction model is to predict the second mouth movement sequence according to the acoustic features.

In one embodiment, the head movement sequence acquisition module is further to obtain head and eye movements within the second duration from a preset video data set, and arrange the head and eye movements to form the head and eye movement sequence corresponding to the text.

In one embodiment, the facial video synthesis module 505 is further to combine the first mouth movement sequence and the second mouth movement sequence to obtain a combined mouth movement sequence, and create the facial action video corresponding to the user according to the combined mouth movement sequence and the image.

It should be noted that the basic principles and technical effects of the talking head video synthesis device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for generating a talking head video with mouth movement sequence, the method comprising:
    obtaining a text and an image containing a face of a user;
    determining a phoneme sequence that corresponds to the text and comprises one or more phonemes;
    determining acoustic features corresponding to the text according to the phoneme sequence, and obtaining synthesized speech corresponding to the text according to the acoustic features;
    determining a first mouth movement sequence corresponding to the text according to the phoneme sequence, and determining a second mouth movement sequence corresponding to the text according to the acoustic features;
    creating a facial action video corresponding to the user according to the first mouth movement sequence, the second mouth movement sequence and the image; and
    processing the synthesized speech and the facial action video synchronously, and generating a talking head video corresponding to the user;
    wherein the method further comprises, before determining the second mouth movement sequence corresponding to the text according to the acoustic features,
    obtaining a video data set that comprises multiple pieces of video data;
    determining a training phoneme sequence corresponding to each of the multiple pieces of video data;
    obtaining acoustic features corresponding to the video data according to the training phoneme sequences, and determining a second initial mouth movement sequence corresponding to the acoustic features;
    determining a first mouth movement sequence corresponding to the training phoneme sequences;
    obtaining a second training mouth movement sequence corresponding to the acoustic features according to the second initial mouth movement sequence and the first mouth movement sequence corresponding to the training phoneme sequence; and
    obtaining a second prediction model using each of the acoustic features and the second training mouth movement sequences corresponding to acoustic features, wherein the second prediction model is configured to predict the second mouth movement sequence according to the acoustic features.

2. The method of claim 1, further comprising, after determining the phoneme sequence that corresponds to the text,
    determining a first duration corresponding to each phoneme in the phoneme sequence, and determining a second duration corresponding to the synthesized speech according to the first duration; and
    obtaining a head and eye movement sequence corresponding to the text according to the second duration;
    wherein creating the facial action video corresponding to the user according to the first mouth movement sequence, the second mouth movement sequence and the image comprises:
    creating the facial action video corresponding to the user according to the first mouth movement sequence, the second mouth movement sequence, the head and eye movement sequence, and the image.

3. The method of claim 2, wherein obtaining the head and eye movement sequence corresponding to the text according to the second duration comprises:
   obtaining head and eye movements within the second duration from a preset video data set, and arranging the head and eye movements to form the head and eye movement sequence corresponding to the text.

4. The method of claim 1, further comprising, before determining the first mouth movement sequence corresponding to the text according to the phoneme sequence,
   obtaining a video data set that comprises multiple pieces of video data;
   determining a training phoneme sequence corresponding to each of the multiple pieces of video data;
   determining a first initial mouth movement corresponding to each training phoneme in the training phoneme sequences;
   determining a first training mouth movement corresponding to each training phoneme according to each first initial mouth movement corresponding to the training phoneme;
   determining a first training mouth movement sequence corresponding to each of the training phoneme sequences according to the first training mouth movement corresponding to each training phoneme; and
   obtaining a first prediction model using each of the training phoneme sequences and the first training mouth movement sequence corresponding to each of the training phoneme sequences, wherein the first prediction model is configured to predict the first mouth movement sequence according to the phoneme sequence.

5. The method of claim 1, wherein creating the facial action video corresponding to the user according to the first mouth movement sequence, the second mouth movement sequence and the image comprises:
   combining the first mouth movement sequence and the second mouth movement sequence to obtain a combined mouth movement sequence; and
   creating the facial action video corresponding to the user according to the combined mouth movement sequence and the image.

6. The method of claim 1, wherein the video data set comprises video data of different users speaking different contents corresponding to different texts.

7. The method of claim 6, wherein each piece of video data comprises facial images of the user speaking an utterance.

8. The method of claim 6, wherein a duration of each piece of video data in the video data set is any value.

9. A device comprising:
   one or more processors; and
   a memory coupled to the one or more processors, the memory storing programs that, when executed by the one or more processors, cause performance of operations comprising:
   obtaining a text and an image containing a face of a user;
   determining a phoneme sequence that corresponds to the text and comprises one or more phonemes;
   determining acoustic features corresponding to the text according to the phoneme sequence, and obtaining synthesized speech corresponding to the text according to the acoustic features;
   determining a first mouth movement sequence corresponding to the text according to the phoneme sequence, and determining a second mouth movement sequence corresponding to the text according to the acoustic features;
   creating a facial action video corresponding to the user according to the first mouth movement sequence, the second mouth movement sequence and the image; and
   processing the synthesized speech and the facial action video synchronously, and generating a talking head video corresponding to the user;
   wherein the operations further comprise, before determining the second mouth movement sequence corresponding to the text according to the acoustic features,
   obtaining a video data set that comprises multiple pieces of video data;
   determining a training phoneme sequence corresponding to each of the multiple pieces of video data;
   obtaining acoustic features corresponding to the video data according to the training phoneme sequences, and determining a second initial mouth movement sequence corresponding to the acoustic features;
   determining a first mouth movement sequence corresponding to the training phoneme sequences;
   obtaining a second training mouth movement sequence corresponding to the acoustic features according to the second initial mouth movement sequence and the first mouth movement sequence corresponding to the training phoneme sequence; and
   obtaining a second prediction model using each of the acoustic features and the second training mouth movement sequences corresponding to acoustic features, wherein the second prediction model is configured to predict the second mouth movement sequence according to the acoustic features.

10. The device of claim 9, wherein the operations further comprise, after determining the phoneme sequence that corresponds to the text,
   determining a first duration corresponding to each phoneme in the phoneme sequence, and determining a second duration corresponding to the synthesized speech according to the first duration; and
   obtaining a head and eye movement sequence corresponding to the text according to the second duration;
   wherein creating the facial action video corresponding to the user according to the first mouth movement sequence, the second mouth movement sequence and the image comprises:
   creating the facial action video corresponding to the user according to the first mouth movement sequence, the second mouth movement sequence, the head and eye movement sequence, and the image.

11. The device of claim 10, wherein obtaining the head and eye movement sequence corresponding to the text according to the second duration comprises:
   obtaining head and eye movements within the second duration from a preset video data set, and arranging the head and eye movements to form the head and eye movement sequence corresponding to the text.

12. The device of claim 9, wherein the operations further comprise, before determining the first mouth movement sequence corresponding to the text according to the phoneme sequence,
   obtaining a video data set that comprises multiple pieces of video data;
   determining a training phoneme sequence corresponding to each of the multiple pieces of video data;

determining a first initial mouth movement corresponding to each training phoneme in the training phoneme sequences;

determining a first training mouth movement corresponding to each training phoneme according to each first initial mouth movement corresponding to the training phoneme;

determining a first training mouth movement sequence corresponding to each of the training phoneme sequences according to the first training mouth movement corresponding to each training phoneme; and obtaining a first prediction model using each of the training phoneme sequences and the first training mouth movement sequence corresponding to each of the training phoneme sequences, wherein the first prediction model is configured to predict the first mouth movement sequence according to the phoneme sequence.

13. The device of claim 9, wherein creating the facial action video corresponding to the user according to the first mouth movement sequence, the second mouth movement sequence and the image comprises:

combining the first mouth movement sequence and the second mouth movement sequence to obtain a combined mouth movement sequence; and creating the facial action video corresponding to the user according to the combined mouth movement sequence and the image.

14. The device of claim 9, wherein the video data set comprises video data of different users speaking different contents corresponding to different texts.

15. The device of claim 14, wherein each piece of video data comprises facial images of the user speaking an utterance, and a duration of each piece of video data in the video data set is any value.

16. A non-transitory computer-readable storage medium storing instructions that, when executed by at least one processor of a device, cause the at least one processor to perform a method, the method comprising:

obtaining a text and an image containing a face of a user;

determining a phoneme sequence that corresponds to the text and comprises one or more phonemes;

determining acoustic features corresponding to the text according to the phoneme sequence, and obtaining synthesized speech corresponding to the text according to the acoustic features;

determining a first mouth movement sequence corresponding to the text according to the phoneme sequence, and determining a second mouth movement sequence corresponding to the text according to the acoustic features;

creating a facial action video corresponding to the user according to the first mouth movement sequence, the second mouth movement sequence and the image; and processing the synthesized speech and the facial action video synchronously, and generating a talking head video corresponding to the user;

wherein the operations further comprise, before determining the second mouth movement sequence corresponding to the text according to the acoustic features, obtaining a video data set that comprises multiple pieces of video data;

determining a training phoneme sequence corresponding to each of the multiple pieces of video data;

obtaining acoustic features corresponding to the video data according to the training phoneme sequences, and determining a second initial mouth movement sequence corresponding to the acoustic features;

determining a first mouth movement sequence corresponding to the training phoneme sequences;

obtaining a second training mouth movement sequence corresponding to the acoustic features according to the second initial mouth movement sequence and the first mouth movement sequence corresponding to the training phoneme sequence; and obtaining a second prediction model using each of the acoustic features and the second training mouth movement sequences corresponding to acoustic features, wherein the second prediction model is configured to predict the second mouth movement sequence according to the acoustic features.

17. The non-transitory computer-readable storage medium of claim 16, wherein the operations further comprise, after determining the phoneme sequence that corresponds to the text, determining a first duration corresponding to each phoneme in the phoneme sequence, and determining a second duration corresponding to the synthesized speech according to the first duration; and obtaining a head and eye movement sequence corresponding to the text according to the second duration;

wherein creating the facial action video corresponding to the user according to the first mouth movement sequence, the second mouth movement sequence and the image comprises:

creating the facial action video corresponding to the user according to the first mouth movement sequence, the second mouth movement sequence, the head and eye movement sequence, and the image.

18. The non-transitory computer-readable storage medium of claim 17, wherein obtaining the head and eye movement sequence corresponding to the text according to the second duration comprises:

obtaining head and eye movements within the second duration from a preset video data set, and arranging the head and eye movements to form the head and eye movement sequence corresponding to the text.

19. The non-transitory computer-readable storage medium of claim 16, wherein the operations further comprise, before determining the first mouth movement sequence corresponding to the text according to the phoneme sequence, obtaining a video data set that comprises multiple pieces of video data;

determining a training phoneme sequence corresponding to each of the multiple pieces of video data;

determining a first initial mouth movement corresponding to each training phoneme in the training phoneme sequences;

determining a first training mouth movement corresponding to each training phoneme according to each first initial mouth movement corresponding to the training phoneme;

determining a first training mouth movement sequence corresponding to each of the training phoneme sequences according to the first training mouth movement corresponding to each training phoneme; and obtaining a first prediction model using each of the training phoneme sequences and the first training mouth movement sequence corresponding to each of the training phoneme sequences, wherein the first prediction model is configured to predict the first mouth movement sequence according to the phoneme sequence.

20. The non-transitory computer-readable storage medium of claim 16, wherein creating the facial action video corresponding to the user according to the first mouth movement sequence, the second mouth movement sequence and the image comprises:
- combining the first mouth movement sequence and the second mouth movement sequence to obtain a combined mouth movement sequence; and
- creating the facial action video corresponding to the user according to the combined mouth movement sequence and the image.

* * * * *